(12) United States Patent
Stabel et al.

(10) Patent No.: US 8,345,815 B2
(45) Date of Patent: Jan. 1, 2013

(54) FUEL ASSEMBLY FOR A PRESSURIZED-WATER NUCLEAR REACTOR

(75) Inventors: Jürgen Stabel, Erlangen (DE); Udo Borsdorf, Höchstadt (DE)

(73) Assignee: Areva NP GmbH, Erlangen (DE)

( * ) Notice: Subject to any disclaimer, the term of this patent is extended or adjusted under 35 U.S.C. 154(b) by 542 days.

(21) Appl. No.: 12/192,764

(22) Filed: Aug. 15, 2008

(65) Prior Publication Data

US 2009/0122945 A1 May 14, 2009

Related U.S. Application Data

(63) Continuation of application No. PCT/EP2007/001052, filed on Feb. 8, 2007.

(30) Foreign Application Priority Data

Feb. 18, 2006 (DE) .......................... 10 2006 007 591

(51) Int. Cl.
*G21C 3/34* (2006.01)
(52) U.S. Cl. ......... 376/438; 376/409; 376/426; 376/434
(58) Field of Classification Search ................... 376/409, 376/426, 434, 438, 439, 449, 462, 442, 443, 376/446
See application file for complete search history.

(56) References Cited

U.S. PATENT DOCUMENTS

| | | |
|---|---|---|
| 4,357,298 A | 11/1982 | Wolters, Jr. et al. |
| 4,659,542 A | 4/1987 | Kerrey |
| 5,243,634 A | 9/1993 | Bryan |
| 6,600,799 B1 | 7/2003 | Kreuter |
| 2006/0193427 A1 * | 8/2006 | Stabel et al. ................... 376/434 |
| 2006/0285629 A1 * | 12/2006 | Stabel et al. ................... 376/438 |

FOREIGN PATENT DOCUMENTS

| | | |
|---|---|---|
| DE | 1589472 | 2/1971 |
| DE | 2253017 * | 7/1973 |
| DE | 3139823 A1 | 5/1982 |
| DE | 10334580 B3 | 3/2005 |
| EP | 1087406 A1 | 3/2001 |
| FR | 2571171 A1 | 4/1986 |
| JP | 11258375 A | 9/1999 |
| WO | WO-2005-098870 A1 * | 10/2005 |

OTHER PUBLICATIONS

International Search Report dated May 31, 2007.

* cited by examiner

*Primary Examiner* — Ricardo Palabrica
*Assistant Examiner* — Marshall O'Connor
(74) *Attorney, Agent, or Firm* — Laurence A. Greenberg; Werner H. Stemer; Ralph E. Locher

(57) ABSTRACT

A fuel assembly for a pressurized water nuclear reactor contains a multiplicity of fuel rods which are guided in a plurality of axially spaced spacers which in each case form a square grid, composed of grid webs, with a multiplicity of cells arranged in rows and columns. In each case one control rod guide tube is guided through a number of these cells. At least one spacer is configured to be mechanically stronger in a first partial region than in a second partial region. In this second partial region, the spacer is provided with at least one resisting element which protrudes into a flow sub-channel formed between the fuel rods and increases the flow resistance. The resisting element counteracts a reduction associated with the mechanically weaker configuration, in the flow resistance in the second partial region and in this manner effects a homogenization of the hydraulic behavior of a spacer which is mechanically inhomogeneous on account of the varying mechanical configuration.

11 Claims, 4 Drawing Sheets

FUEL ASSEMBLY FOR A PRESSURIZED-WATER NUCLEAR REACTOR

CROSS-REFERENCE TO RELATED APPLICATION

This is a continuation, under 35 U.S.C. §120, of copending international application No. PCT/EP2007/001052, filed Feb. 8, 2007, which designated the United States; this application also claims the priority, under 35 U.S.C. §119, of German patent application No. DE 10 2006 007 591.9, filed Feb. 18, 2006; the prior applications are herewith incorporated by reference in their entirety.

BACKGROUND OF THE INVENTION

Field of the Invention

The invention relates to a fuel assembly for a pressurized-water nuclear reactor, as is known, for example, from German patent No. DE 103 34 580 B3.

The basic design of a fuel assembly for a pressurized-water nuclear reactor is illustrated by way of example in FIG. 6. In the fuel assembly of this type, a large number of fuel rods 2 are guided parallel to one another in the rod direction (axially) by a plurality of spacers 4 which are axially spaced apart from one another and in each case form a two-dimensional grid with a plurality of cells 6 arranged in columns 8 and rows 10. As well as the fuel rods 2, at selected positions support tubes, which do not contain any fuel and are intended to receive and guide control rods (known as control rod guide tubes 12), are also guided through the cells 6 of this grid. Moreover, there may also be support tubes, which likewise do not contain any fuel and serve only to increase the stability (instrumentation thimbles or structure tubes; in the fuel assembly 2 illustrated by way of example neither instrumentation thimbles nor structure tubes are provided). These support tubes, unlike the fuel rods, are welded to the spacers 4 in the cells 6, so that their stabilizing action is ensured throughout the entire life span of the fuel assembly 2.

In the event of hypothetical external accidents, for example in the event of an earthquake or a loss of coolant accident (LOCA) with a major leak, the spacers may be subject to a considerable impact load from the adjacent fuel assemblies. The permanent deformations which then occur and are usually noticed as formationing of individual rows or columns must not exceed maximum permissible values, in order to ensure that the control rods can still be introduced into the control rod guide tubes in order in this way to allow operation to continue safely or to allow the plant to be shut down safely. Whereas plastic deformations to a limited extent are in principle permitted, accordingly relatively extensive buckling, which leads to a significant offset of the control rod guide tubes arranged in the fuel assembly, must be avoided.

Accordingly, the spacers are configured in such a way that the expected impact loads do not lead to relatively extensive buckling or formationing of the spacer. In practice, the development aim is a buckling resistance for fresh, unirradiated spacers (BOL (=beginning of life) spacers) of approximately 20 kN. Therefore BOL spacers can withstand the impact load (areally active transverse force) which occurs in the event of an accident (earthquake, LOCA) provided that this impact load is lower than 20 kN.

In particular spacers which have been in use for a relatively long period of time and have reached the end of their service life (EOL=end of life) can still experience, in unfavorable situations, forces which are greater than their buckling resistance, since the latter can be significantly reduced compared to new spacers. This reduction in the buckling resistance is in this case dependent on the particular type of spacer and may amount to more than 50 to 60%.

German patent DE 103 34 580 B3, corresponding to U.S. Patent Application Publication No. US 2006/0285629 A1, therefore proposes, in order to improve the accident safety, to configure the spacer such that, when a limit force acting laterally on the spacer is exceeded, only a region of the spacer whose cells are located outside an internal region which contains the control rod guide tubes begins to deform. This deformation behavior can be achieved in that the spacer outside the internal region is configured to be mechanically weaker.

SUMMARY OF THE INVENTION

It is accordingly an object of the invention to provide a fuel assembly for a pressurized-water nuclear reactor which overcomes the above-mentioned disadvantages of the prior art devices of this general type, which has a high accident safety and good thermohydraulic characteristics.

With the foregoing and other objects in view there is provided, in accordance with the invention, a fuel assembly for a pressurized-water nuclear reactor. The fuel assembly contains a plurality of axially spaced spacers in each case forming a square grid. The spacers have grid webs defining a plurality of cells disposed in rows and columns. A plurality of fuel rods are guided in the axially spaced spacers and control rod guide tubes are provided. In each case one of the control rod guide tubes is guided through a number of the cells. At least one of the spacers has a first partial region configured mechanically stronger than a second partial region and has in the second partial region at least one resistance body projecting into a flow subpassage, formed between the fuel rods. The resistance body increases a flow resistance and counteracts a reduction in the flow resistance in the second partial region caused by the second partial region being mechanically weaker.

According to these features, and starting from the fuel assembly known from German patent DE 103 34 580 B3 in which at least one spacer is configured with a first partial region being mechanically stronger than a second partial region, at least one resistance body is provided in the second partial region. The resistance body projects into a flow subpassage that is formed between the fuel rods, and increases the flow resistance which counteracts a reduction of the flow resistance in the second partial region, which reduction accompanies the mechanically weaker configuration. The invention is now based on the findings that the weaker configuration of the spacer in the edge region, which can be achieved by way of example by reducing the wall thickness of the grid webs in the edge region or by reducing the number or extent of the weld spots where the grid webs are welded together, results in the flow resistance of the spacer in the weakened external regions being smaller than in the internal region. In other words, the mechanical inhomogeneity of the spacer, introduced in order to improve the EOL behavior, can bring about a hydraulic inhomogeneity, i.e. a heterogeneous distribution of the loss of pressure occurring from the flow of the coolant through the spacer in the axial direction of the fuel rods.

Increasing the flow resistance in the second partial region which is configured to be mechanically weaker according to the invention in a targeted manner, locally increases the pressure loss there such that the hydraulic inhomogeneities, which occur on account of the differing mechanical configurations in the first and second partial regions, are reduced. In other words, despite an inhomogeneity of the mechanical configuration of the spacers, the measures according to the invention achieve a large degree of homogeneity in the pressure loss produced via the spacers. It is preferably desired here to configure the resistance body or bodies such that the reduction, accompanying the mechanically weaker configuration, in the flow resistance in the second partial region is at least approximately compensated for.

The resistance bodies are preferably disposed at a point of intersection of the grid webs, i.e. in the center of a flow subpassage formed by four neighboring fuel rods. Such a central arrangement, in particular one in the region of the edge of a grid web, of the resistance bodies can be used to produce local flow profiles in a particularly simple manner, which flow profiles run rotation-symmetrically around the center of the flow subpassage such that the resistance bodies do not produce flow patterns which bring about forces which act transversely to the flow direction of the coolant on the fuel assembly.

The resistance bodies can be a separate component which is welded together with at least one of the grid webs. Alternatively to this, the resistance bodies can also, in a particularly simple manner in terms of manufacturing technology, be in the form of a shaped section introduced into the grid webs.

The cells of the spacer are preferably formed by grid edge webs disposed on the edge and by internal grid webs which are located inside, wherein the term grid web can refer to both grid edge webs and internal grid webs below in the following text. The edge zone or the second partial region in which such mechanical weakening is carried out is then formed from the internal grid webs located outside the internal region, from the ends, which project outwardly beyond the internal region, of the internal grid webs passing through the internal region and from the grid edge webs.

The grid webs are preferably connected to one another by way of weld connections, wherein at least some of the weld connections of the internal grid webs outside the first partial region have a lower stability than the weld connections of the internal grid webs inside the first partial region.

In an advantageous embodiment of the invention, at least some of the internal grid webs have a material weakening in a web region located outside the first partial region with respect to the web regions arranged inside the internal region, wherein the material weakening is brought about in particular by a smaller wall thickness (web width) of the internal grid webs.

Other features which are considered as characteristic for the invention are set forth in the appended claims.

Although the invention is illustrated and described herein as embodied in a fuel assembly for a pressurized-water nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
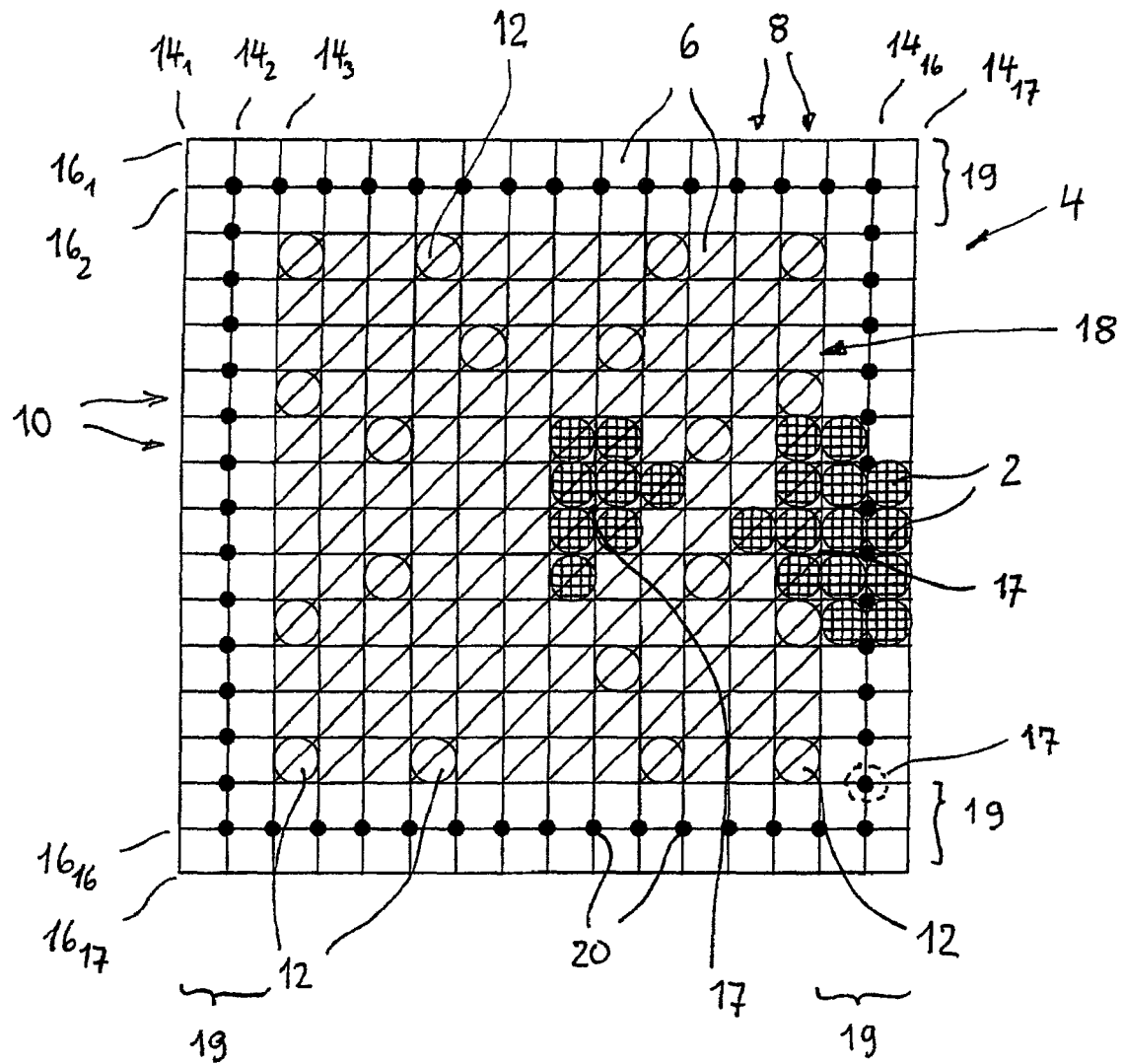
FIG. 1 is a diagrammatic, plan view of a spacer according to the invention.

Referring now to the figures of the drawing in detail and first, particularly, to FIG. 1 thereof, there is shown a spacer 4 constructed from grid webs $14_1$-$14_{17}$ and $16_1$-$16_{17}$ which are welded together at points of intersection. The grid webs $14_1$, $14_{17}$, $16_1$ and $16_{17}$ form an edge of the grid and are denoted as grid edge webs below. The grid webs $14_2$-$14_{16}$ and $16_2$-$16_{16}$ extend inside the grid and are denoted as internal grid webs below. The intersecting grid webs $14_1$-$14_{17}$ and $16_1$-$16_{17}$ form a square grid with a large number of (in the example 16×16) cells 6, by way of which webs the fuel rods 2 are guided in the cells 6 through which support tubes do not pass, only a few of the fuel rods being illustrated in FIG. 1 for clarity reasons. In each case four neighboring fuel rods 2 determine a flow subpassage 17 through which the coolant flows parallel to the fuel rods 2 (axially) and thus perpendicular to the drawing plane.

In the exemplary embodiment, all the support tubes are control rod guide tubes 12. Further structure tubes are not present in this exemplary embodiment.

The control rod guide tubes 12 determine a first partial region 18 (highlighted by hatching) which is formed in the exemplary embodiment by a square internal region which is limited by the internal grid webs $14_3$, $14_{15}$, $16_3$ and $16_{15}$ and contains the internal grid webs $14_3$, $14_{15}$, $16_3$ and $16_{15}$. The first partial region 18 is surrounded by a second partial region 19, which in FIG. 1 is an edge region containing two columns 8 and rows 10. The spacer 4 is now of a mechanically stronger configuration, according to German patent DE 103 34 580 B3, in its first partial region 18 than in the second partial region 19. The technical measures which are necessary for such a stronger configuration of the first partial region 18 or, if viewed from the opposite point of view, a weaker configuration of the second partial region 19—variation in thickness or number of weld points, increase or decrease of the wall thickness of the grid webs, introduction of instances of material weakening, for example in the form of cutouts in the web regions of the second partial region 19—would now result in the flow resistance of the spacer 4 in the first partial region 18 being larger than in the second partial region 19, so that the pressure loss produced by the spacer 4 in the coolant which flows parallel to the axial direction of the fuel rods 2, i.e. perpendicular to the grid plane, would become inhomogeneous. In this manner, pressure gradients in the grid plane which extends perpendicular to the axial direction of the fuel rods would be produced and would lead to undesired transverse flows.

In order to avoid this inhomogeneity, the invention therefore provides measures in the second partial region 19 with which the reduction of the flow resistance is largely compensated for.

This is illustrated FIG. 1 with the aid of the points which are characterized by a black circle and which indicate that flow subpassages 17, which are located outside the first partial region 18, are provided, in the region of the internal grid webs $16_2$-$16_{16}$ and $14_2$-$14_{16}$ which intersect there, with a resistance body 20 which increases the flow resistance in these flow subpassages 17 without canceling out the mechanical weakening which was introduced deliberately, according to German patent DE 103 34 580 B3, in the internal grid webs $14_{2-16}$ and $16_{2-16}$ which extend in the second partial region 19.

Figure 2:
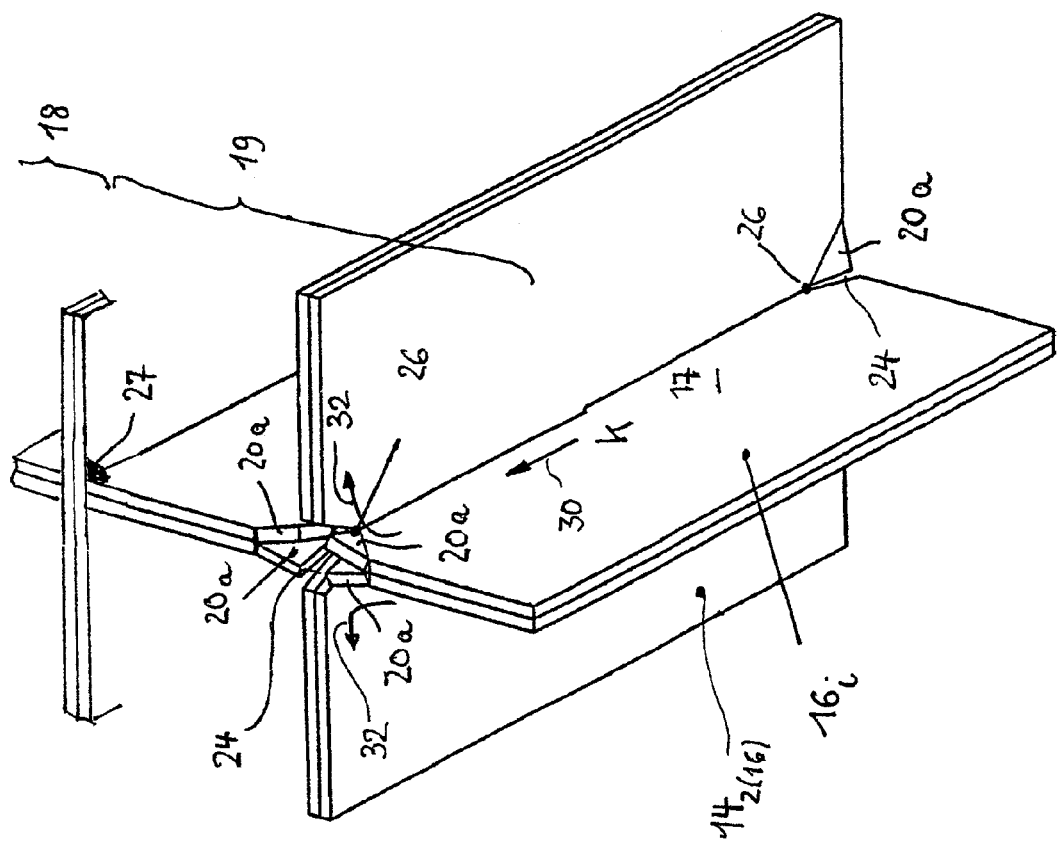
FIGS. 2-5 are diagrammatic, perspective views in each case showing a point of intersection of the spacer in an edge region in which respectively different embodiments of the invention for increasing a local flow resistance are illustrated.

In the exemplary embodiment according to FIG. 2, such an increase in the flow resistance at a point of intersection which is located in the second partial region 19 is achieved in the spacer 4 which is made of double-walled grid webs $14_i$, $16_i$ in that each metal-sheet strip of an internal grid web $16_i$ exhibits at its upper edge (in the fuel assembly which is inserted vertically in the core) in the region of the point of intersection a buckling or a formation 20a which is inclined into the flow subpassage 17 associated with this point of intersection or into the inside of the respectively adjoining cell 6. These formations 20a have an approximately triangular shape. The internal grid web $14_2$ or $14_{16}$, which intersects the internal grid web $16_i$, has in this region an approximately V-shaped cutout 24 and is welded, at its base, to the internal grid web $16_i$. The weld connection is configured, according to the procedure proposed in German patent DE 103 34 580 B3, to be weaker than the weld connections present in the first partial region 18. This is illustrated in FIG. 2 by way of a weld node 26 which has a smaller diameter than the weld nodes 27 (drawn in FIG. 2 at a neighboring point of intersection in an exaggerated and schematic manner) which are present in the first partial region 18 in order to in this manner produce a targeted weakening of the mechanical stability in the second partial region 19. Formations 20a, of which only one formation 20a can be seen in FIG. 2, are also attached on the lower edge, which lies opposite the upper edge, to the internal grid web $14_2$ or $14_{16}$. The small weld node 26, by way of which the intersecting grid webs $16_i$ and $14_{2,16}$ are welded together, is also located here on the base of the V-shaped cutout 24.

A coolant K flowing (axially) in the direction of arrow 30 is deflected at the formations 20a such that a flow component is formed which is directed parallel to the grid plane, as is illustrated in FIG. 2 by arrows 32. The deflection is oriented here in pairs in opposite directions such that the transverse force which is produced by the deflection of the flow onto the spacer and thus onto the fuel assembly disappears.

Figure 3:
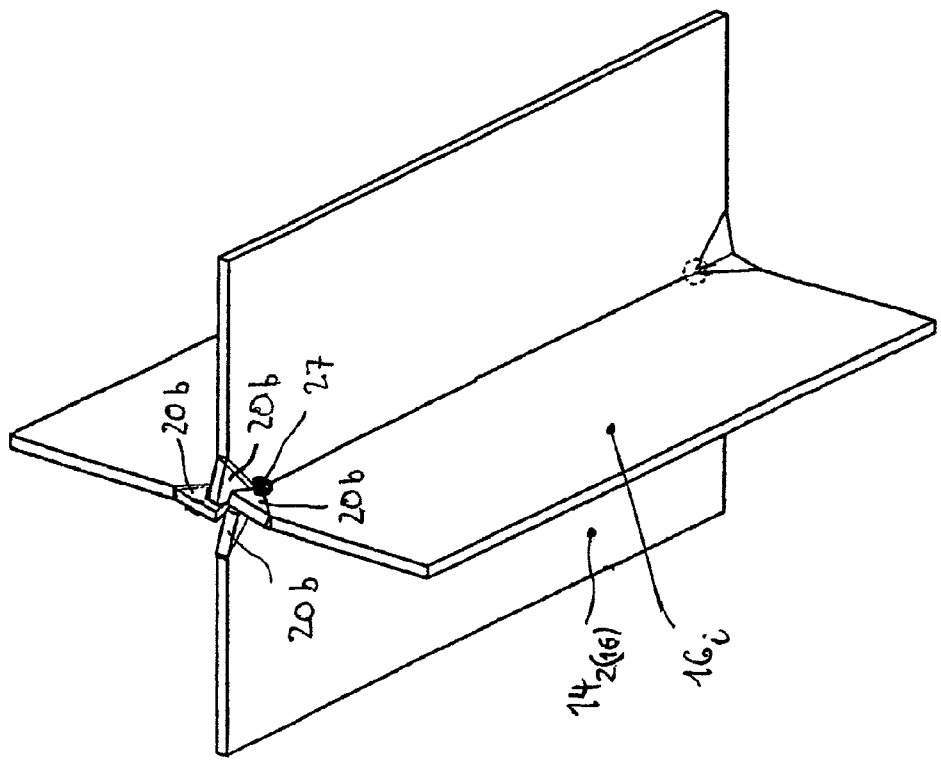

In the exemplary embodiment according to FIG. 3, triangular formations 20b, which cause a swirl around the central axis of the flow subpassage 17 in the flowing coolant on the remote flow side, are likewise provided in the region of the point of intersection both at the upper edge and on the lower edge of the grid webs $14_{2(16)}$, $16_i$ in a spacer 4 which is made of single-wall grid webs $14_{2(16)}$, $16_i$. The internal grid webs $14_{2(16)}$ and $16_i$ are welded together by weld nodes 27 in the region of the upper edge, the extent of the weld nodes and the associated mechanical stability of the weld connection being comparable with the weld nodes used in the first partial region. In this exemplary embodiment, the targeted mechanical weakening in the second partial region is achieved by reducing the number of weld nodes 27 and thus the stability of the weld connection. This is illustrated by the absence of a weld node—illustrated in FIG. 3 by dashes—on the lower edge.

Figure 4:
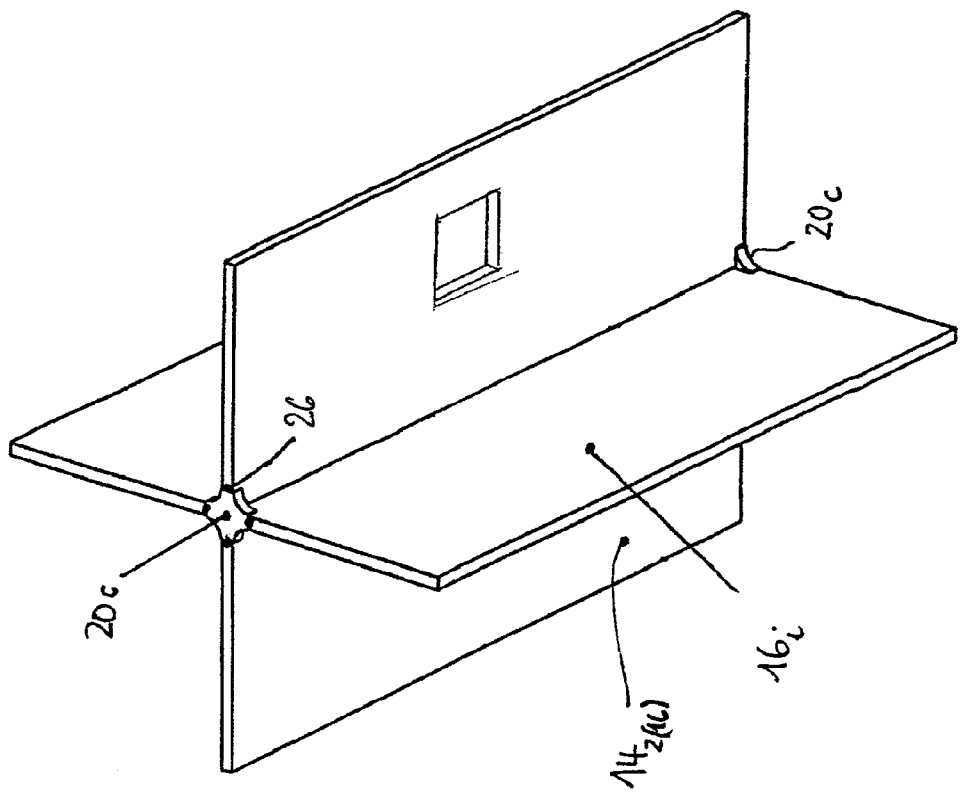
Figure 5:
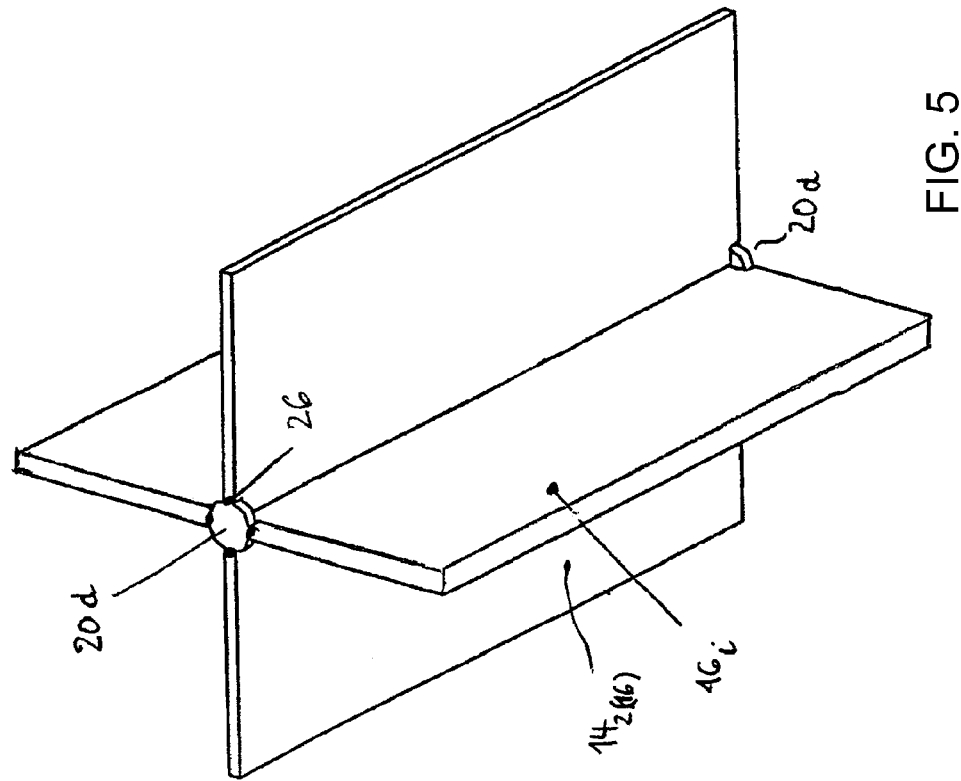
Figure 6:
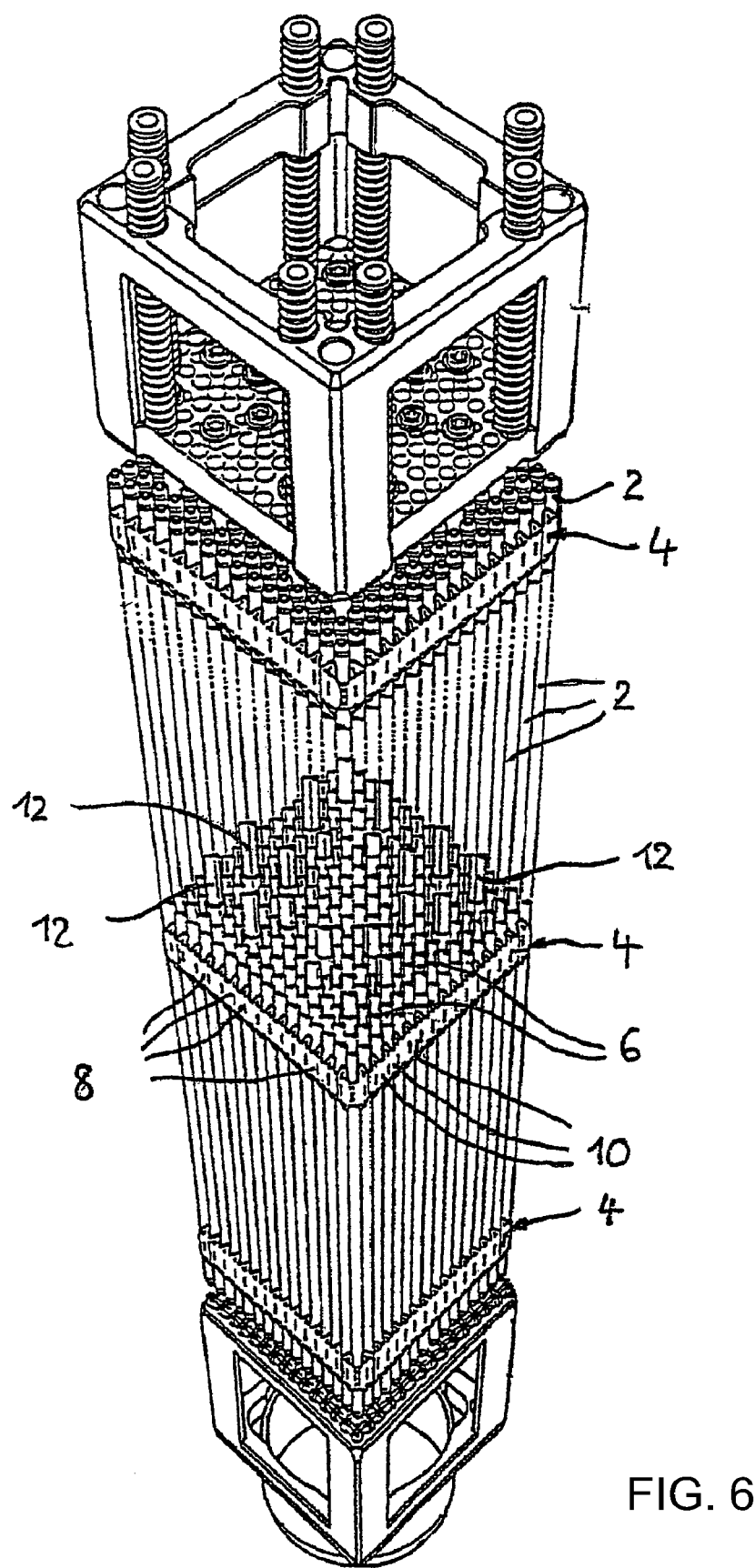
FIG. 6 is a diagrammatic, perspective view of a fuel assembly for a pressurized-water nuclear reactor, as is known in the prior art.

In the exemplary embodiments according to FIGS. 4 and 5, the resistance bodies are formed by plate-type components 20c and 20d which are separately welded together with the internal grid webs $14_{2(16)}$ and $16_i$ with in each case four weld nodes 26, which components have, in the exemplary embodiment according to FIG. 4, an approximately cross-type shape and in the exemplary embodiment according to FIG. 5 have a circular disk-type shape. The internal grid webs $14_{2(16)}$ and $16_i$ are in this case provided at the points of intersection with cutouts into which the components 20c, 20d are inserted such that their flat side, which faces away from the support face, lies in the same plane as the upper edge or lower edge of the grid webs $14_{2,16}$ and $16_i$.

In the exemplary embodiment according to FIG. 4, the targeted weakening of the second partial region is effected by a material weakening caused by cutouts 36, whereas in the exemplary embodiment according to FIG. 5, the internal grid webs $14_2$ and $14_{16}$ which extend completely in the second partial region (and, analogously, the internal grid webs $16_2$ and $16_{16}$) have a smaller wall thickness than the other grid webs.

The invention is not limited to fuel assemblies with the square 16×16 spacer illustrated in the exemplary embodiment, but can also be used in fuel assemblies with other spacer geometries.

The invention claimed is:

1. A fuel assembly for a pressurized-water nuclear reactor, the fuel assembly comprising:
    a plurality of axially spaced spacers in each case forming a square grid, said spacers having grid webs defining a plurality of cells disposed in rows and columns;
    a plurality of fuel rods guided in said axially spaced spacers;
    control rod guide tubes, in each case one of said control rod guide tubes being guided through a number of said cells; and
    at least one of said spacers having a first partial region configured mechanically stronger than a second partial region and has only in said second partial region a plurality of resistance bodies projecting into a flow subpassage, formed between said fuel rods, said resistance bodies increasing a flow resistance and counteracting a reduction in the flow resistance in said second partial region relative to said first partial region caused by said second partial region being mechanically weaker than said first partial region.

2. The fuel assembly according to claim 1, wherein said resistance bodies at least approximately compensate for the reduction in the flow resistance in said second partial region caused by the mechanically weaker said second partial region.

3. The fuel assembly according to claim 1, wherein said resistance bodies are disposed at a point of intersection of said grid webs.

4. The fuel assembly according to claim 1, wherein said resistance bodies are disposed in a region of an edge of one of said grid webs.

5. The fuel assembly according to claim 1, wherein said resistance bodies are a component which is welded together with at least one of said grid webs.

6. The fuel assembly according to claim 1, wherein said resistance bodies are a formation introduced into said grid webs.

7. The fuel assembly according to claim 1, wherein forces exerted by said resistance bodies by way of a flowing coolant onto the fuel assembly transverse to a flow direction of the flowing coolant onto the fuel assembly are at least approximately compensated for.

8. The fuel assembly according to claim 1, wherein said first partial region is an internal region containing said control rod guide tubes and said second partial region is formed by said cells disposed outside of said first partial region.

9. The fuel assembly according to claim 8, wherein said cells of said spacer are formed by said grid webs, said grid webs include grid edge webs, disposed on an edge and internal grid webs located inside, said grid webs are connected to one another by weld connections, at least some of said weld connections of said internal grid webs outside of said first partial region exhibit a lower stability with respect to said weld connections disposed inside said first partial region.

10. The fuel assembly according to claim 9, wherein at least some of said internal grid webs have a material weakening in a web region disposed outside of said first partial region.

11. The fuel assembly according to claim 10, wherein said internal grid webs disposed outside said first partial region have a smaller wall thickness than said internal grid webs which pass through said first partial region.

\* \* \* \* \*